March 23, 1943.      H. R. MOULTON      2,314,363
HEAT RETARDING DEVICE
Filed Oct. 6, 1939      2 Sheets-Sheet 1
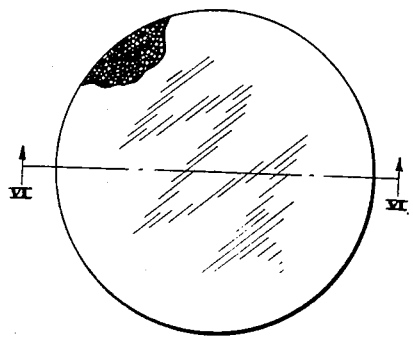
Fig. V
Fig. VI
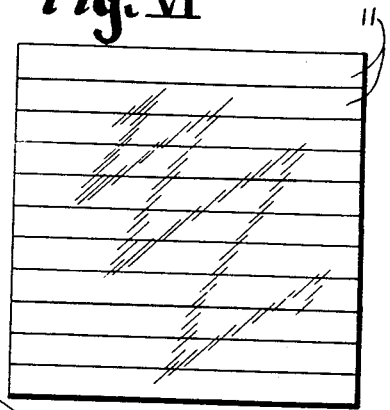
Fig. II
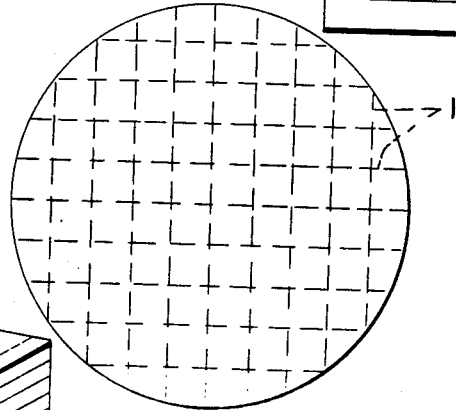
Fig. VII
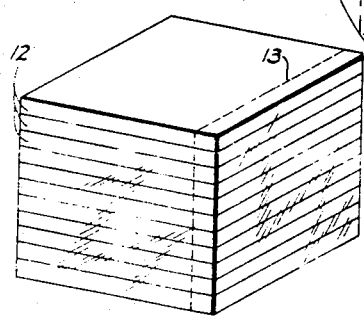
Fig. I
INVENTOR.
HAROLD R. MOULTON
BY Harry H. Styll.
ATTORNEY.

March 23, 1943. H. R. MOULTON 2,314,363
HEAT RETARDING DEVICE
Filed Oct. 6, 1939 2 Sheets-Sheet 2
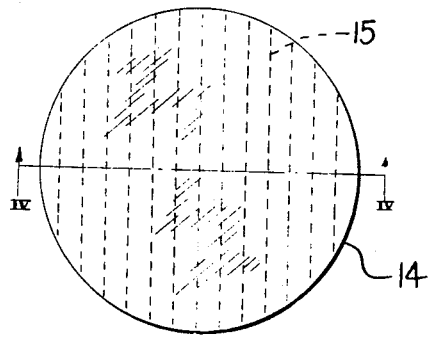
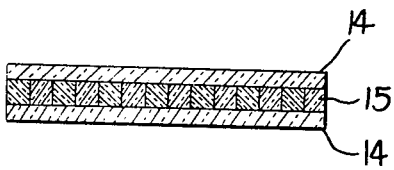
Fig. IV
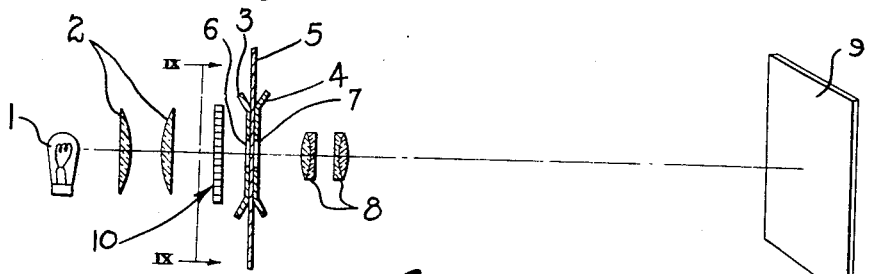
Fig. III
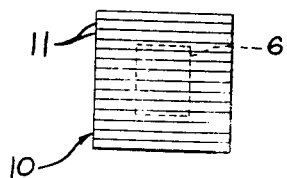
Fig. VIII
Fig. IX
INVENTOR.
HAROLD R. MOULTON
BY Harry H. Still
ATTORNEY.

Patented Mar. 23, 1943

2,314,363

UNITED STATES PATENT OFFICE 2,314,363

HEAT RETARDING DEVICE

Harold R. Moulton, Southbridge, Mass., assignor to American Optical Company, Southbridge, Mass., a voluntary association of Massachusetts Application October 6, 1939, Serial No. 298,273

4 Claims. (Cl. 88—109)

This invention relates to improvements in heat retarding devices and has particular reference to novel means and method of making the same.

One of the principal objects of the invention is to provide a heat screen for use with a projection apparatus embodying a beam of projected light traversing an aperture of a given size, which heat screen comprises a plurality of separate portions, bonded together so as to provide a plurality of sections or portions of material having infra-red absorbing characteristics bonded together so as to provide a plurality of said portions within the area of the aperture of the projector so as to absorb the infra-red rays of the projected beam of light and yet remove the danger of breakage of said heat screen. and has particular reference to novel methods of making the same.

Another object of the invention is to provide a heat screen comprising a plurality of portions of transparent, substantially colorless infra-red absorbing material, bonded together in contiguous relation with each other so as to produce a screen of sufficient area to intercept a projected beam of light, so as to absorb the infra-red rays of said projected beam with little reduction of transmission of the visible rays and with appreciably no change of the color values of said projected beam of light, and particularly novel process or method of making the same.

Another object is to provide a heat screen of the above character, having its various portions sandwiched between protective layers of transparent sheet material.

Another object is to provide a heat screen composed of a plurality of longitudinal sections secured in adjacent edge to edge relation with each other, so as to produce a sheet-like screen having different portions thereof independently free to expand or contract under the influence of temperature changes.

Another object is to provide a heat screen composed of a plurality of relatively small portions of transparent, substantially colorless infra-red absorbing material, bonded together so that an effectively continuous heat absorbing screen is provided.

Another object is to provide heat retarding screens of the above character, which are particularly adaptable for use with projection apparatus designed for projecting films or slides of the commercially known Kodachrome type, wherein materially no change of the various color values of said Kodachrome films or slides will take place, or for use with any of the commercially known color projection means.

Another object is to provide heat screens of the above character which are particularly resistant to breakage during use, and novel methods of making the same.

Other objects and advantages of the invention should become apparent from the following description taken in connection with the accompanying drawings, and it will be apparent that many changes may be made in the details of construction, arrangement of parts, and steps of the method shown and described, without departing from the spirit of the invention, as expressed in the accompanying claims. I, therefore, do not wish to be limited to the exact details of construction, arrangement of parts, and methods shown and described, as the preferred forms only have been given by way of illustration.

Referring to the drawings:

Fig. I is a perspective view illustrating a step in the process of manufacture of one of the heat screens embodying the invention;

Fig. II is a face view of a heat screen, formed in accordance with the process illustrated in Fig. I;

Fig. III is a face view of a modified form of heat screen;

Fig. IV is a sectional view taken as on line IV—IV of Fig. III;

Fig. V is a face view of a further modification of the invention;

Fig. VI is a sectional view taken as on line VI—VI of Fig. V;

Fig. VII is a face view of a further modification;

Fig. VIII is a view diagrammatically illustrating a heat screen embodying the invention in associated relation with a projection device, and illustrating one position of use of said heat screen in said device; and Fig. IX is a partial view looking in the direction indicated by the arrows IX—IX in Fig. VIII, diagrammatically illustrating the relation of the component parts of a heat screen embodying the invention, with the aperture of the projection device illustrated in Fig. VIII.

In the prior art there have existed heat screens for the prevention of overheating of transparencies, but such heat screens, because of their chemical composition, possessed undesirable selective absorption in the visible region of the spectrum. This absorption resulted in the distortion of color values, especially reds, yellows, and whites.

In copending application, Serial No. 273,362, E. D. Tillyer, et al., filed May 12, 1939, a transparent, substantially colorless glass composition is disclosed, having infra-red absorbing means therein, suitable for producing a heat screen having substantially no effect upon the color values projected light. It has not as yet become possible to control the coefficient of thermal expansion of such heat retarding materials and breakage is apt to occur during use because of the rapid and relatively irregular distribution of heat in the heat retarding material.

It has been customary in the prior art to use heat retarding means in loosely mounted strips, but such methods of mounting are not satisfactory and mechanical breakage is very apt to occur. This is due to the fact that in most instances in the past the strips were supported independently of each other and were susceptible to breakage, due to the sudden mechanical shock. The discontinuity between the heat absorbing elements also produced loss of light by reflection because of the large difference between the index of refraction of the heat absorbing material and air.

It, therefore, is one of the primary objects of this invention to overcome the above difficulties through the provision of means having all of the desirable characteristics of a heat retarding material such as disclosed in copending application, Serial No. 273,562, E. D. Tillyer, et al., filed May 12, 1939, which forms part of the disclosure of this application, and which will, in addition, have the additional desirable characteristics of reduced breakage hazard because of thermal or mechanical shock.

Referring more particularly to the drawings, wherein like characters of reference designate like parts throughout the several views, the various heat screens embodying the invention are designed particularly for use with a projection apparatus such as is diagrammatically illustrated in Fig. VIII. Such projection devices comprise broadly a source of illumination 1, condensing lenses 2, for producing a concentrated beam of light from said source of illumination, supports 3 and 4 for supporting a film or other transparency 5, and having apertures 6 and 7 through which the concentrated beam of light is directed, and a focusing lens system 8 for producing a projected image on a suitable image receiving screen 9.

A heat screen embodying an invention such as illustrated at 10 is preferably supported so as to intercept the projected beam of light prior to its traversing the apertures 6 and 7, and the transparency 5 supported in alignment with said apertures.

One of the heat screens embodying the invention as illustrated in Figs. I and II comprises a plurality of longitudinal sections 11 secured in edge to edge relation with each other by a suitable bonding material, such as a resin of the polyvinyl acetal type, or by any other suitable known bonding material.

This particular heat screen is preferably formed by initially securing a plurality of plates 12 of a transparent, substantially colorless material having infra-red absorbing means therein, such as disclosed in copending application, Serial No. 273,362, E. D. Tillyer, et al., filed May 12, 1939, which are secured throughout their interfaces by a relatively thin layer of bonding material of the characteristics set forth above. The assembly thus formed is then cut as illustrated by the dash lines 13 into relatively thin plates or sheets. This cutting operation may be performed by suitable diamond saw or abrading wheel. The resulting screen will, therefore, comprise a plurality of longitudinal sections 11 secured in adjacent edge to edge relation with each other by the bonding material, so that the screen may be handled or supported as a single unit.

If desired, as illustrated in Figs. III and IV, the heat screen 11 such as illustrated in Fig. II may be provided on one or both sides thereof, with a supporting protective plate of transparent, colorless medium 14. The plates 14 are preferably formed of material resistant to heat shock, such as Pyrex, or its equivalent, or fused quartz, or its equivalent, bonded to the infra-red absorbing portions 15 by a relatively thin layer of bonding material having the characteristics of the bonding material set forth above, for joining the various sections 11. This bonding material has elastic characteristics which prevent the setting up of strain which might cause breakage during use. The relatively thin layers of bonding material, of course, are between the plates 14 and the inner composite screen 15. The screen 15, instead of being formed of a plurality of longitudinal sections 11, may, as shown in Figs. V and VI, be formed of a plurality of granules, spheres, or particles 16 of the transparent, substantially colorless infra-red absorbing material, bonded together by bonding means having the characteristics of the bonding means set forth above, or by bonding means having the characteristics set forth above, modified so as to have the index or refraction of the bonding means substantially identical with the index of refraction of the tranparsent, substantially colorless infra-red absorbing material. This modification of the index of refraction is for the purpose of minimizing diffusion. It is also desirable that the reciprocal relative dispersion of the bonding means be nearly the same as that of the granules.

It is particularly pointed out that the granules or particles of transparent, substantially colorless infra-red absorbing material are so massed into contiguous relation with each other as to produce an effectively continuous heat retarding screen. This is brought about by overlapping the edges of the adjacent granules, which may or may not be in a single layer. If desired, the screen thus formed may be provided with one or more protective outer layers 17 of transparent material simulating the material of the parts 14.

If desired, instead of forming the heat screen of a plurality of longitudinal sections 11 the said screen may be formed of a plurality of segments 18 secured in edge to edge relation with each other by a suitable bonding material such as illustrated in Fig. VII. The various segments may be square, rectangular, diamond shape, or of any other desirable contour shape permitting the edges thereof to be secured in fitted relation with each other so as to produce an effectively continuous heat rearding screen. The various segments may, if desired, be secured between superimposed transparent plates such as illustrated at 14 and 17.

Although applicant has shown several different methods of forming a heat screen embodying a plurality of separate parts secured in adjacent relation with each other so as to produce an effectively continuous heat screen, it is to be understood that other modifications may be made, for example, instead of utilizing a plurality of granules 16, a plurality of flakes or thin flat plates of the desirable infra-red absorbing material might be used, in which instance the said flakes or plates would be secured in a suspending or supporting material such as set forth above.

Although applicant has shown and described the heat retarding screens as being particularly adaptable for use in projection devices, it is to be understood that they may be utilized in several different ways, for example, they may be used in illumination devices, such as operating lamps, diagnostic instruments, microscope lamps, opaque projectors, or in any other similar device wherein the presence of heat is objectionable.

All of the heat screens embodying the invention are of such characteristics that, when used in a projection apparatus, a plurality of adjacent parts of said heat screen will lie within the area of the aperture of the projector, and although uniting with each other, will be separately free to expand or contract under the influence of heat. Due to this fact, therefore, the heat screens will be exceptionally resistant to thermal or mechanical shock.

It is to be understood that any suitable means for supporting the heat screens may be employed. It is also to be understood that the heat screens may be located at any desired position between the source of illumination and the object illuminated.

If desired, instead of forming the heat retarding screen for a plurality of separate sections, a continuous sheet of transparent, substantially colorless infra-red absorbing means may be secured between two superimposed layers of transparent sheet material having the characteristics of the sheet materials 14 and 17. In this instance the continuous sheet of infra-red absorbing material would be secured between the outer transparent sheets by bonding material having the characteristics of the bonding material set forth above. It will be apparent that should the layer of infra-red absorbing material accidentally become fractured, it would retain its shape, that is, the parts would be held together by the bonding material and the superimposed outer layers of transparent material.

From the foregoing description it will be seen that simple, efficient and economical means and method have been provided for accomplishing all the objects and advantages of the invention.

Having described my invention I claim:

1. A heat retarding unit comprising a plurality of substantially flat and substantially colorless pieces of material transparent to the visible rays and embodying means having a relatively high absorption of infra-red rays joined in contiguous edge to edge relation with each other by a transparent plastic bonding material with each of said pieces having a flat surface facing substantially in the same direction to produce a sheet-like optically homogeneous structure with the index of refraction of said pieces of material substantially the same as the index of refraction of the bonding material and with the opposed outer surfaces of the sheet-like optically homogeneous structure being optically equivalent to relatively continuous surfaces so that the resultant unit will have a minimum light diffusing effect and with the said bonding material so associated with said pieces of material as to permit independent expansion and contraction of said pieces relative to each other.

2. A heat retarding unit comprising a plurality of substantially flat and substantially colorless pieces of material transparent to the visible rays and embodying means having a relatively high absorption of infra-red rays joined in contiguous edge to edge relation with each other by a transparent plastic bonding material with each of said pieces having a flat surface facing substantially in the same direction to produce a sheet-like optically homogeneous structure with the index of refraction of said pieces of material substantially the same as the index of refraction of the bonding material and with the opposed outer surfaces of the sheet-like optically homogeneous structure being optically equivalent to relatively continuous surfaces so that the resultant unit will have a minimum light diffusing effect and with the said bonding material so associated with said pieces of material as to permit independent expansion and contraction of said pieces relative to each other and a layer of transparent material on at least one side of said structure.

3. A heat retarding unit comprising a plurality of pieces of substantially colorless material transparent to the visible rays and embodying means having a relatively high absorption of infra-red rays joined in contiguous edge to edge relation with each other by a transparent plastic bonding material to produce a sheet-like optically homogeneous structure with the index of refraction and the reciprocal relative dispersion of said pieces of material substantially the same as the index of refraction and the reciprocal relative dispersion of the bonding material and with the opposed outer surfaces of the sheet-like optically homogeneous structure being optically equivalent to relatively continuous surfaces so that the resultant unit will have a minimum light diffusing effect and with the said bonding material so associated with said pieces of material as to permit independent expansion and contraction of said pieces relative to each other.

4. A heat retarding unit comprising a plurality of substantially flat pieces of substantially colorless material transparent to the visible rays and embodying means having a relatively high absorption of infra-red rays joined in contiguous edge to edge relation with each other by a transparent plastic bonding material with each of said pieces having a flat surface facing substantially in the same direction to produce a sheet-like optically homogeneous structure with the index of refraction of said pieces of material substantially the same as the index of refraction of the bonding material and with the opposed outer surfaces of the sheet-like optically homogeneous structure being optically equivalent to relatively continuous surfaces so that the resultant unit will have a minimum light diffusing effect and with the said bonding material so associated with said pieces of material as to permit independent expansion and contraction of said pieces relative to each other.

HAROLD R. MOULTON.